US007252211B2

(12) United States Patent
Bougamont

(10) Patent No.: US 7,252,211 B2
(45) Date of Patent: Aug. 7, 2007

(54) ATOMISER COMPRISING A PUMP THAT FORMS A STOPPER

(75) Inventor: Jean-Louis Bougamont, Eu (FR)

(73) Assignee: Rexam Dispensing Systems S.A.S. (FR)

( * ) Notice: Subject to any disclaimer, the term of this patent is extended or adjusted under 35 U.S.C. 154(b) by 0 days.

(21) Appl. No.: 11/247,919

(22) Filed: Oct. 11, 2005

(65) Prior Publication Data

US 2006/0081656 A1 Apr. 20, 2006

Related U.S. Application Data

(63) Continuation of application No. PCT/EP2004/003765, filed on Apr. 8, 2004.

(30) Foreign Application Priority Data

Apr. 9, 2003 (FR) .................................. 03 04417

(51) Int. Cl.
*G01F 11/16* (2006.01)

(52) U.S. Cl. .............................. 222/321.9; 222/321.7; 222/385

(58) Field of Classification Search .............. 222/321.9
See application file for complete search history.

(56) References Cited

U.S. PATENT DOCUMENTS

| | | | | |
|---|---|---|---|---|
| 5,277,340 | A * | 1/1994 | Van Brocklin | 222/321.7 |
| 6,073,805 | A | 6/2000 | Gueret | 222/95 |
| 6,279,786 | B1 * | 8/2001 | de Pous et al. | 222/321.9 |
| 6,364,167 | B1 | 4/2002 | Safian et al. | 222/153.13 |
| 7,011,236 | B2 * | 3/2006 | VanBrocklin | 222/321.9 |
| 2002/0179649 | A1 | 12/2002 | Plessis | 222/321.9 |

OTHER PUBLICATIONS

International Search Report, Jul. 30, 2004, 2 pages.

* cited by examiner

*Primary Examiner*—J. Casimer Jacyna
(74) *Attorney, Agent, or Firm*—St. Onge Steward Johnston & Reens LLC

(57) ABSTRACT

An atomizer provided with a manually activated pump forming a stopper, which is mounted by force in the opening of the bottle. The bottle is made entirely from a plastic material, moulded as a single piece, and the opening of this bottle comprises on the inside an annular hooking rib and the plastic material used to make the bottle is harder and more rigid than the material used to make the pump body so that the said rib can encrust in the pump body.

11 Claims, 2 Drawing Sheets

ATOMISER COMPRISING A PUMP THAT FORMS A STOPPER

This application is a continuation of pending International Patent Application No. PCT/EP2004/003765 filed on Apr. 8, 2004, which designates the United States and claims priority of French Patent Application No. 0304417 filed on Apr. 9, 2003.

FIELD OF THE INVENTION

The invention relates to an atomiser comprising a manually activated pump, the pump body of which, made from a flexible plastic material, forms a stopper that is mounted by force in the opening of a bottle; it relates more specifically to an improvement of the bottle when the latter is made from a plastic material. A preferred field of application of the invention is that of miniature atomisers used for distributing samples of liquid products, mainly perfumes.

SUMMARY OF THE INVENTION

A manually activated pump is already known, provided with a button that forms an atomiser, the body of which can distort slightly in order to create a stopper that can be mounted by force in the opening of the bottle. The bottle can be made from a plastic material. In this case, the inner surface of the opening is as smooth as possible for the purpose of watertightness. In the field of miniature atomisers, the bottle is often presented in the shape of a small cylinder. In this case, the interior volume of the bottle is also cylindrical and the opening cannot be told apart from the rest of the bottle.

We have detected that, after packaging and mounting the pump in the cylindrical opening the risk of the pump coming back out remains; since the pump is fitted against a wall that is both too smooth and too perfectly cylindrical it cannot be adequately stabilised in the bottle. The invention makes it possible to solve this problem.

More specifically, the invention relates to a manually activated pump comprising a pump body made from a plastic material forming a stopper, which is mounted by force in the opening of a bottle, characterised in that the said bottle is made entirely from a plastic material moulded as a single piece and in that the said opening comprises an annular hooking rib on the inside, made by moulding, the plastic material that makes up the bottle being harder and more rigid than the material used to make the pump body to that the said hooking rib becomes encrusted in the said pump body.

The aforementioned hooking rib is preferably defined in the immediate proximity of the orifice of the said opening, which facilitates the removal of the bottle from the mould. More specifically, the hooking rib is defined by a restriction of the opening in the immediate proximity of the orifice of the latter. In most cases, the hooking rib will be defined by a greater thickness of the wall in the proximity of the said orifice.

The structure defined above is well suited for injection moulding of the bottle. The mould comprises a cylindrical die inside which a globally cylindrical punch is inserted, but the punch comprises an annular back draft area that is able to define the greater thickness of the aforementioned wall, in the proximity of the opening orifice. The bottle is removed from the mould by force using an ejection ring that slides along the punch when the latter is removed from the die, pushing off the bottle that was just moulded.

BRIEF DESCRIPTION OF THE DRAWINGS

The invention will be better understood and further advantages will become apparent in the light of the following description of an atomiser according to its principle and the method for moulding the bottle of this atomiser, provided only as an example and made in reference to the appended drawings in which.

DETAILED DESCRIPTION OF DRAWINGS

Figure 1:
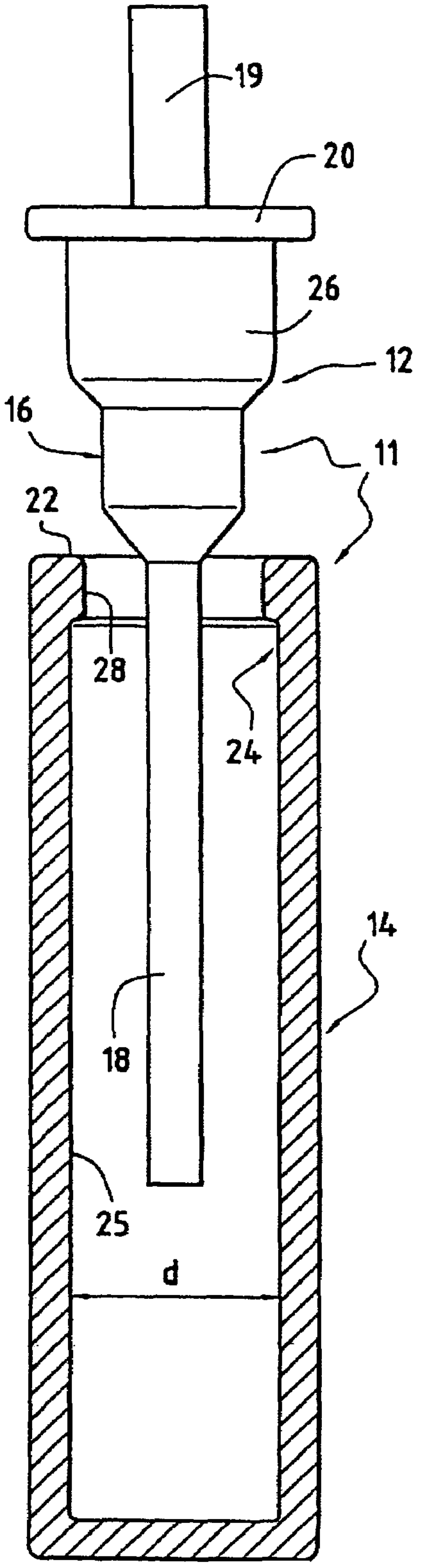
FIG. 1 is an elevation view showing the bottle and the pump prior to assembly.
Figure 2:
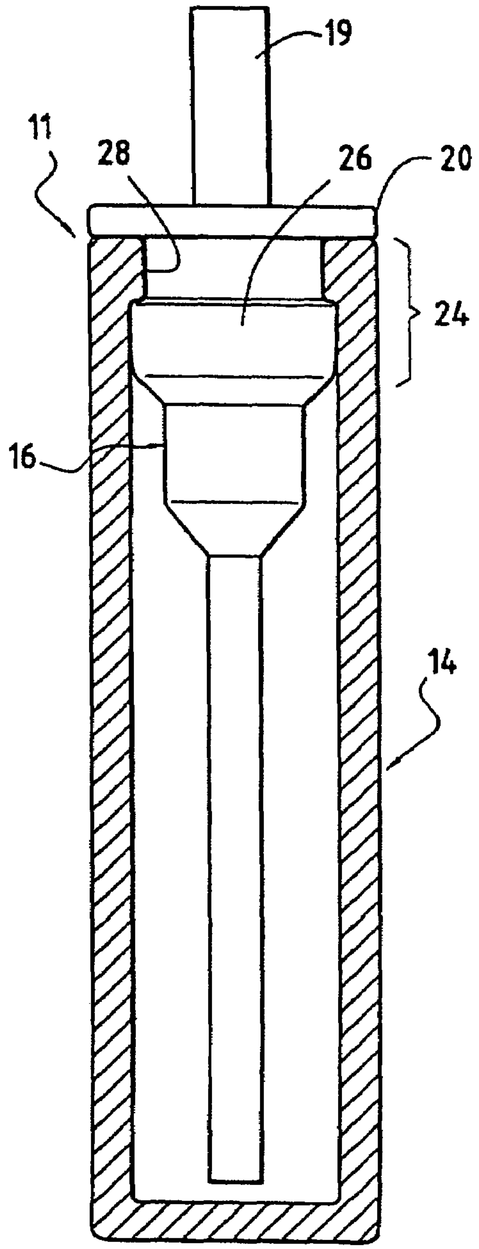
FIG. 2 is a similar view to that shown in FIG. 1, showing the bottle and the pump assembled.
Figure 7:
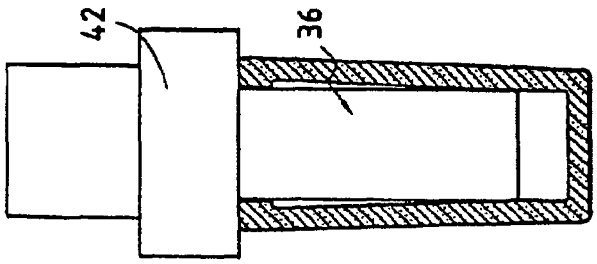
FIGS. 3 to 7 show a diagram of the process for moulding the bottle from a plastic material.

The miniature atomiser 11 shown in FIGS. 1 and 2 is made up essentially of a manually activated pump 12 and an externally cylindrical bottle 14. The pump 12 is of a known type comprising a pump body 16 made from a soft, distortable plastic material, a suction tube 18 and an outlet tube 19 on which a tappet-button (not shown) is fitted, provided with spraying means. The pump body 16 comprises a skirt 20 that is applied around the orifice 22 of the opening 24 of the bottle. The part of the pump body that makes up a stopper 26, more specifically, is cylindrical and has a diameter that is substantially the same as the inner diameter d of the bottle. The latter, for reasons of manufacturing simplicity, has an inner cavity 25 that is essentially cylindrical. The opening 24 intended to receive the part of the pump body that forms a stopper 26 cannot be told apart from the rest of the bottle, since both parts have the same diameter. The bottle is obviously made entirely from a plastic material moulded as a single piece.

According to an important feature of the invention, the inside of the opening 24 comprises an annular hooking rib 28 made when moulding. According to another important feature, the plastic material used to make the bottle 14 is harder and more rigid than that used to make the pump body 16, or at least the part of the latter that forms the stopper 26, so that the hooking rib 28 can encrust in the pump body, with a slight creep of the plastic material that makes up the latter, as can be seen in FIG. 2. For example, the pump body 16 on the one hand and the bottle 14 on the other can be made from different grades of polyolefins. A flexible grade is chosen for the pump body and a rigid grade for the bottle. As shown, the hooking rib 28 is defined in the immediate proximity of the orifice 22 and projects internally in relation to the rest of the cylindrical surface of the opening. It is defined by a restriction of the diameter in the immediate proximity of the orifice of the said opening. In other words, the hooking rib is defined by a greater thickness of the wall of the opening in the proximity of the orifice of the bottle.

Figure 6:
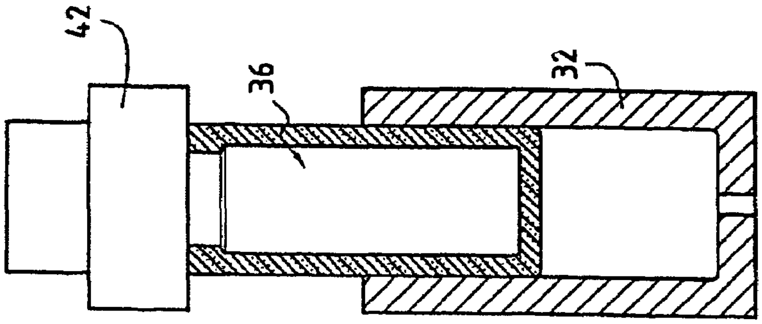
Figure 5:
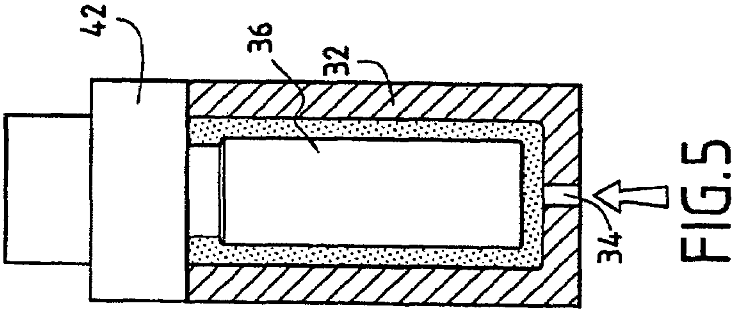
Figure 4:
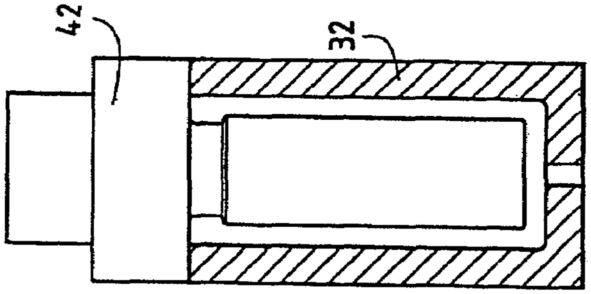
Figure 3:
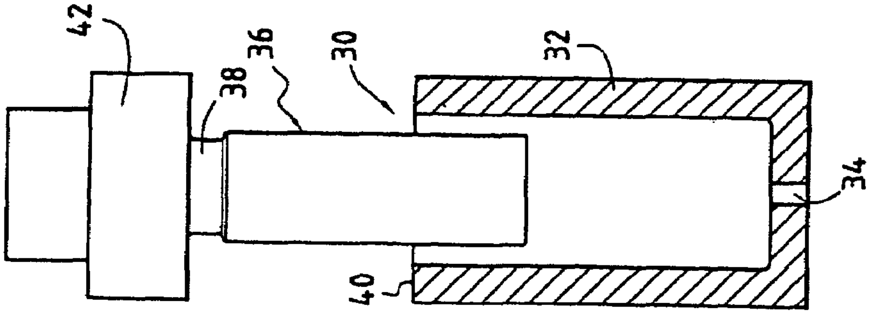

FIGS. 3 to 7 show the process for injection moulding of the bottle. The mould 30 is made up of a perfectly cylindrical die 32 (the orifice for injecting the plastic material opens into the bottom of this die) and a globally cylindrical punch 36 which has a back draft area 38, in this case made up of a simple annular groove that is positioned next to the orifice 40 of the die 32 when the punch is in position. A ring 42 for removing the bottle from the mould is mounted such as to slide along the punch and closes off the orifice of the die. In this position shown in FIG. 4, it is clear that the volume of the bottle is defined between the die and the punch. After injecting the plastic material (FIG. 5) and when cooling starts, the punch is removed from the die and, due to its back draft, the bottle remains hooked to the punch (FIG. 6). A relative movement between the ring 42 and the punch 36 makes it possible to remove the bottle 14 by force by making it slide along the punch. During this operation (FIG. 7), the opening of the bottle expands slightly due to the simple elasticity of the plastic material.

What is claimed is:

1. An atomiser comprising:

a manually activated pump comprising a pump body made from a first plastic material forming a stopper which is mounted by force in an opening of a bottle;

wherein said bottle is made entirely from a second plastic material molded as a single piece;

wherein said opening comprises an internal annular hooking rib, made by molding; and wherein the first plastic material used to make the bottle is harder and more rigid that the second material used to make said pump body, so that said hooking rib embeds in the stopper of said pump body.

2. An atomiser according to claim 1, wherein said hooking rib is defined in the immediate proximity of an orifice of the opening of the bottle.

3. An atomiser according to claim 2, wherein said hooking rib is defined by a reduced diameter of the opening in the immediate proximity of the orifice.

4. An atomiser according to claim 3, wherein said hooking rib is defined by a greater thickness of a wall in the proximity of the orifice of the opening of the bottle.

5. An atomiser according to claim 4, wherein said bottle is an injection molded bottle.

6. An atomizer, comprising:

a manually activated pump comprising a pump body, the pump body comprised entirely of a first plastic material; and a substantially cylindrical bottle comprising an opening, said bottle being a one-piece bottle molded entirely of a second plastic material;

a cylindrical inner cavity in said bottle comprising an inner diameter;

a stopper portion of the pump body mountable in the opening, said stopper portion having a stopper diameter substantially equal to the inner diameter; and an annular hooking rib comprised in the opening, said annual hooking rib having a rib diameter less than the inner diameter;

wherein the second plastic material is harder than the first plastic material; and wherein, upon inserting the pump body in the opening, at least a portion of the stopper portion is deformed about said hooking rib and said hooking rib is embedded therein.

7. The atomizer according to claim 6, wherein at least a second portion of said stopper portion rests against the inner diameter of said inner cavity upon inserting the pump body in the opening.

8. The atomizer according to claim 6, wherein the pump further comprises a skirt, the skirt resting adjacent to an exterior surface of the opening upon inserting the pump body in the opening.

9. The atomizer according to claim 6, wherein the first plastic material is a first polyolefin material and the second plastic material is a second polyolefin material.

10. The atomizer according to claim 9, wherein the second polyolefin material is a more rigid grade polyolefin as compared to the first polyolefin material.

11. The atomizer according to claim 6, wherein said bottle includes a first wall thickness in the proximity of the hooking rib and a second wall thickness in the cavity, wherein the first thickness is greater than the second thickness.

* * * * *